(12) United States Patent
Nakada et al.

(10) Patent No.: US 9,517,766 B2
(45) Date of Patent: Dec. 13, 2016

(54) PARKING ASSISTANCE DEVICE AND PARKING ASSISTANCE DEVICE CONTROL METHOD

(71) Applicant: Hitachi Automotive Systems, Ltd., Hitachinaka-shi, Ibaraki (JP)

(72) Inventors: Yuki Nakada, Yokohama (JP); Takuya Murakami, Fujisawa (JP); Toshiya Oosawa, Yokohama (JP)

(73) Assignee: Hitachi Automotive Systems, Ltd., Hitahinaka-shi (JP)

( * ) Notice: Subject to any disclaimer, the term of this patent is extended or adjusted under 35 U.S.C. 154(b) by 0 days.

(21) Appl. No.: 14/412,496

(22) PCT Filed: May 22, 2013

(86) PCT No.: PCT/JP2013/064158
§ 371 (c)(1),
(2) Date: Jan. 2, 2015

(87) PCT Pub. No.: WO2014/006993
PCT Pub. Date: Jan. 9, 2014

(65) Prior Publication Data
US 2016/0001774 A1 Jan. 7, 2016

(30) Foreign Application Priority Data
Jul. 3, 2012 (JP) .................................. 2012-148978

(51) Int. Cl.
*B60L 9/00* (2006.01)
*B60W 30/06* (2006.01)
(Continued)

(52) U.S. Cl.
CPC ................ *B60W 30/06* (2013.01); *B60R 1/00* (2013.01); *B60W 10/04* (2013.01); *B60W 10/08* (2013.01);
(Continued)

(58) Field of Classification Search
USPC .......................................................... 701/22
See application file for complete search history.

(56) References Cited

U.S. PATENT DOCUMENTS 5,931,252 A 8/1999 Shimizu et al.
6,269,307 B1 7/2001 Shinmura et al.
(Continued)

FOREIGN PATENT DOCUMENTS

JP 10-278825 A 10/1998
JP 2000-57495 A 2/2000
(Continued)

OTHER PUBLICATIONS

International Search Report (PCT/ISA/210) dated Jun. 18, 2013 with English-language translation (Five (5) pages).
(Continued)

*Primary Examiner* — Hussein A. Elchanti
(74) *Attorney, Agent, or Firm* — Crowell & Moring LLP

(57) ABSTRACT

A parking assist device includes a target steering angle setting section configured to set a target value of the steering angle; a target vehicle speed setting section configured to set a target value of the vehicle speed; an automatic steering control device configured to automatically steer the steering wheel so that the sensed steering angle becomes the target steering angle; an automatic vehicle speed control device configured to automatically control the vehicle speed so that the sensed vehicle speed becomes the target vehicle speed; and a parking space recognizing section configured to recognize a parking space of the host vehicle, the host vehicle being parked within the recognized parking space by the automatic steering control device and the automatic vehicle speed device.

17 Claims, 7 Drawing Sheets

(51) Int. Cl.
*B62D 15/02* (2006.01)
*B60R 1/00* (2006.01)
*B60W 10/04* (2006.01)
*B60W 10/184* (2012.01)
*B60W 10/20* (2006.01)
*B60W 10/08* (2006.01)

(52) U.S. Cl.
CPC ............ *B60W 10/184* (2013.01); *B60W 10/20* (2013.01); *B62D 15/0285* (2013.01); *B60R 2300/607* (2013.01); *B60R 2300/806* (2013.01); *B60W 2520/00* (2013.01); *B60W 2710/207* (2013.01); *B60W 2720/10* (2013.01); *B60W 2720/14* (2013.01)

(56) References Cited

U.S. PATENT DOCUMENTS

| | | | | |
|---|---|---|---|---|
| 8,521,364 | B2 * | 8/2013 | Hueger | B62D 15/0285 701/36 |
| 2005/0060073 | A1 * | 3/2005 | Tanaka | B62D 15/0285 701/36 |
| 2005/0270177 | A1 * | 12/2005 | Mori | B60T 7/12 340/932.2 |
| 2007/0027598 | A1 * | 2/2007 | Mori | B60W 10/06 701/41 |
| 2009/0259365 | A1 * | 10/2009 | Rohlfs | B62D 15/028 701/41 |
| 2010/0070138 | A1 * | 3/2010 | Schoening | B60Q 9/004 701/42 |
| 2010/0259420 | A1 * | 10/2010 | Von Reyher | B62D 15/028 340/932.2 |
| 2010/0286872 | A1 * | 11/2010 | Endo | B62D 7/159 701/41 |
| 2011/0120797 | A1 * | 5/2011 | Kitahata | B62D 5/04 180/443 |
| 2012/0133767 | A1 * | 5/2012 | Muramatsu | B60R 1/00 348/148 |

FOREIGN PATENT DOCUMENTS

| | | |
|---|---|---|
| JP | 2004-338638 A | 12/2004 |
| JP | 2007-278898 A | 10/2007 |
| JP | 2008-201177 A | 9/2008 |
| JP | 2011-46335 A | 3/2011 |
| JP | 2012-96597 A | 5/2012 |

OTHER PUBLICATIONS

Japanese-language Office Action issued in counterpart Japanese Application No. 2012-148978 dated Apr. 11, 2016 (two (2) pages).

* cited by examiner

PARKING ASSISTANCE DEVICE AND PARKING ASSISTANCE DEVICE CONTROL METHOD

TECHNICAL FIELD

This invention relates to a parking assist device.

BACKGROUND ART

A conventional assist device is configured to automatically vary a steering angle in accordance with a position relationship between a parking position and a vehicle while the vehicle is driving, and thereby to assist a driving operation of a driver.

PRIOR ART DOCUMENT

Patent Document

Japanese Patent Application Publication No. 10-278825

SUMMARY OF THE INVENTION

Problems which the Invention is Intended to Solve

In the above-described conventional device, there are needs to further improve an accuracy of the parking position.

It is an object of the present invention to provide a parking assist device devised to improve an accuracy of a parking position.

Means for Solving the Problem

A parking assist device according to the present invention is configured to park a host vehicle within a parking space which is recognized by an automatic steering control device and an automatic vehicle speed control device.

Benefit of the Invention

Accordingly, the parking assist device according to the present invention makes it possible to improve the accuracy of the parking position.

DESCRIPTION OF EMBODIMENTS

Figure 1:
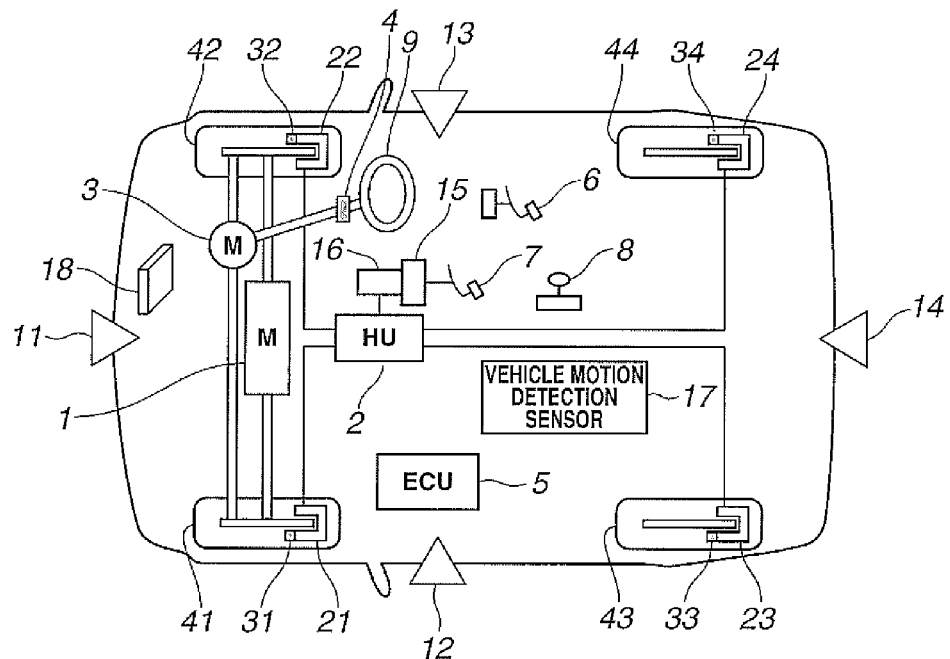
FIG. 1 is a configuration view showing a vehicle to which a parking assistance device is applied.

Hereinafter, an example performing a parking assist device according to the present invention is illustrated based on an embodiment shown in the drawings.

Besides, the embodiment illustrated hereinafter is examined to be suitable for many needs. Improving the accuracy of the parking position is one of the examined needs. The below embodiment is suited for the needs to obtain more smooth vehicle behavior, and a steering operation which are easy to expected by the driver, and to provide secure feeling.

First Embodiment

First, configuration is illustrated.

[Vehicle Configuration]

FIG. 1 is a configuration view of a vehicle to which a parking assist device is applied.

A driver instructs a forward movement, a backward movement, and a stop of a vehicle by a shift lever 8. The driver instructs a driving force of a driving motor (electric motor) 1 by an accelerator pedal 6. The driving motor 1 may be an engine. The driving motor 1 can generate the driving force and a braking force, independently of the accelerator pedal operation, and a shift operation of the driver.

The depression force of a brake pedal 7 is boosted amplified by a brake booster 15, so that the hydraulic pressure is generated in a master cylinder 16 in accordance with that force. The generated force is supplied through an electric hydraulic pressure brake 2 to wheel cylinders 21-24. In this way, the driver controls the braking force by a brake pedal 7. The electric hydraulic pressure brake 2 includes a pump arranged to be driven by a motor, a solenoid valve and so on. The electric hydraulic brake 2 can independently control braking forces of four wheels (hydraulic pressures of the wheel cylinders 21-24), independently of the operation of the brake pedal of the driver. Besides, there is no difference between left and right braking forces of the four wheels by the operation of the brake pedal of the driver.

An electric power steering 3 is configured to generate an assist torque in accordance with a steering torque inputted through a steering wheel 9 by the driver. Left and right front wheels (steered wheels) 41 and 42 are steered by a steering torque of the driver, and the assist torque of the electric power steering 3, so that the vehicle is turned while the vehicle is driving. Moreover, the electric power steering 3 can generate the steering torque, independently of the steering operation of the driver. The electric power steering 3 can steer the left and right front steered wheels 41 and 42.

Moreover, there are provided four cameras 11-14 which are mounted to front and rear, and left and right portions of the vehicle, which shoots circumference around the vehicle, and which recognizes objects around the vehicle. Images of the four cameras 11-14 are composited. The composited image is displayed as an overhead view in a touch panel (touch screen) 18 as the vehicle and the circumference around the vehicle are viewed down from the above. The driver can park the vehicle while looking this overhead view, without relying on the control of the parking assist.

The parking assist device according to the first embodiment recognizes a parking position (parking space) based on a parking frame and positions of other parked vehicles of (on) the image of the cameras 11-14. The parking assist device automatically control the driving motor 1, the electric hydraulic pressure brake 2, and the electric power steering 2 so that the vehicle reaches the recognized parking position. Moreover, the driver can instructs the parking position by using the touch panel 18 in which the overhead view is displayed.

Furthermore, there are provided a steering angle sensor (steering angle sensing section) 4 and wheel speed sensors 31-34 for controlling the parking track (running track). The electric hydraulic pressure brake 2 performs an anti-skid control and an anti-lock brake control by sensor signals from the wheel speed sensors 31-34, the steering angle sensor 4, and a vehicle motion detection sensor 17 arranged to sense a longitudinal acceleration, a lateral acceleration, and a yaw rate. The signals from the steering angle sensor 4 and the wheel speed sensors 31-34 are combinedly used with the control of the parking assist.

All of the above-described electric devices are controlled by an electronic control unit (controller) 5. All of the sensor signals are inputted to the electronic control unit 5. The sensor signals include an accelerator pedal operation amount, a brake pedal operation amount, a shift position, and a steering torque which are operation amounts of the driver. Moreover, the functions of the electronic control unit 5 may be divided. Electronic control units may be attached to the respective electric devices. Necessary information may be communicated among the electronic control units.

The automatic vehicle speed control device configured to automatically control the vehicle speed is constituted by the driving motor 1, the electric hydraulic pressure brake 2, the wheel cylinders 21-24, the wheels 41-44, and the electronic control unit 5. The automatic steering control device arranged to automatically steer the left and right front wheels 41 and 42 is constituted by the electric power steering 3, and the electronic control unit 5.

[Parking Assist Device Configuration]

Figure 2:
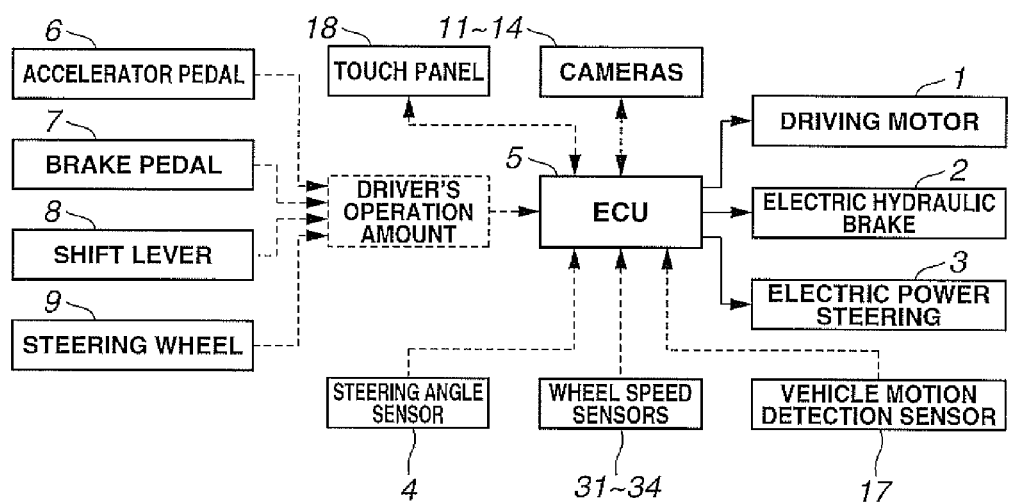
FIG. 2 is a configuration view showing the parking assistance device.

FIG. 2 is a configuration view of the parking assist device.

The vehicle motion is automatically controlled by the driving motor 1, the electric hydraulic pressure brake 2, and the electric power steering 3 during the parking operation. However, the operation amount of the driver is monitored, and it is possible to perform the driver's override. When the driver operates the brake pedal 7, the vehicle is once stopped. After the driver releases the brake, the parking operation by the automatic control is restarted. With this, the brake operation of the driver is preferentially performed when the obstacle enters the path of the parking. Accordingly, it is possible to avoid the contact with the obstacle. Then, when the operation of the brake pedal 7 is released, the parking operation by the automatic control is restarted. With this, when the obstacle becomes apart from the parking path, it is possible to automatically restart the parking assist. Moreover, when the driver varies the shift position, or when the steering torque of the driver becomes equal to or greater than a predetermined value, the parking operation by the automatic control is stopped. With this, it is possible to run the vehicle so that the shift operation or the steering operation of the driver has the priority. Besides, an automatic control stop button may be displayed in the touch panel 18, and it is possible to stop the automatic control by pushing this automatic control stop button.

[Parking Assist Control]

Figure 3:
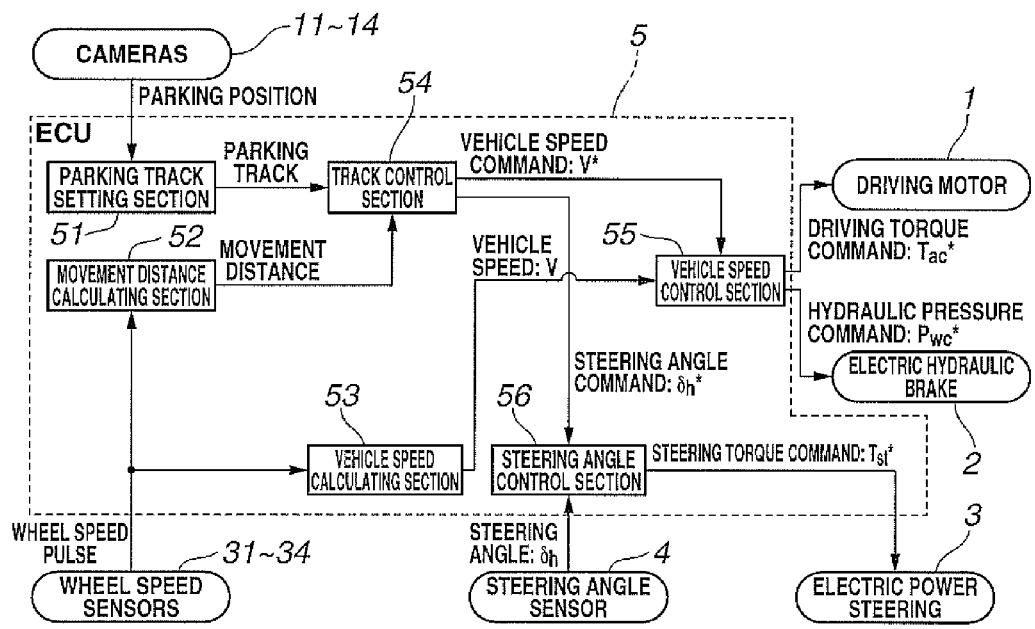
FIG. 3 is a configuration view showing a control of the parking assistance.

FIG. 3 is a configuration view showing a control of a parking assist of the electronic control unit 5.

The electronic control unit 5 includes, as a configuration to attain the control of the parking assist, a parking track setting section 51, a movement distance calculating section 52, a vehicle speed calculating section (vehicle speed sensing section) 53, a track control section (target steering angle setting section, target vehicle speed setting section) 54, a vehicle speed control section 55, and a steering angle control section 56.

First, the cameras (parking space recognizing section) 11-14 recognize the parking position at a parking operation start position. As described above, the driver may indicate the parking position by the touch panel 18 in which the overhead view is displayed. Next, the parking track setting section 51 sets the parking track based on the parking position. The setting of the parking track is performed only one time at the parking operation start. The parking track is not corrected during the parking operation. The parking track is represented as the steering angle with respect to the movement distance of the vehicle.

The wheel speed sensors 31-34 generate a plurality of wheel speed pulses per one rotation of the wheel. A number of generations of this wheel speed pulses are accumulated, and the movement distance calculating section 52 calculates the movement distance of the vehicle. Moreover, the vehicle speed calculating section 53 calculates a vehicle speed V by using the generation periods of the wheel speed pulses. In the first embodiment, the vehicle speed V and the movement distance are the vehicle speed and the movement distance of the center of the rear wheel shaft (axle). The average values of the movement distances and the wheel speeds of the left and right rear wheels 43 and 44 are the calculated movement distance and the calculated vehicle speed V.

The track control section 54 determines a vehicle speed command (a target value of the vehicle speed) V* and a steering angle command (a target value of the steering angle) $\delta_h^*$. The vehicle speed command V* during the forward movement and the rearward movement are constant respectively.

The vehicle speed control section 55 performs the vehicle speed control based on the vehicle speed command V* and the vehicle speed V. The vehicle speed control section 55 determines, as the operation amount, a driving torque command $T_{ac}^*$ to the driving motor 1, and a hydraulic pressure command $P_{wc}^*$ to the electric hydraulic brake 2. The driving motor 1 and the electric hydraulic brake 2 generate the driving force and the braking force by these commands. The only driving motor 1 may generate the driving force and the braking force. Moreover, it is optional to divide so that the driving motor 1 generates the driving force, and the electric hydraulic pressure brake 2 generates the braking force. In a case where the driving motor 1 is replaced by the engine, the latter method is employed. In the first embodiment, the engine is not used, and the driving motor 1 is used. However, the driving motor 1 generates the driving force, and the electric hydraulic pressure brake 2 generates the braking force.

The steering angle control section 56 performs the steering angle control based on the steering angle command $\delta_h{}^*$ and the steering angle $\delta_h$ measured by the steering angle sensor 4. The steering angle control section 56 determines the steering torque command Tst* as the operating amount. The electric power steering 3 generates the steering torque by this command.

[Vehicle Speed Control]

Figure 4:
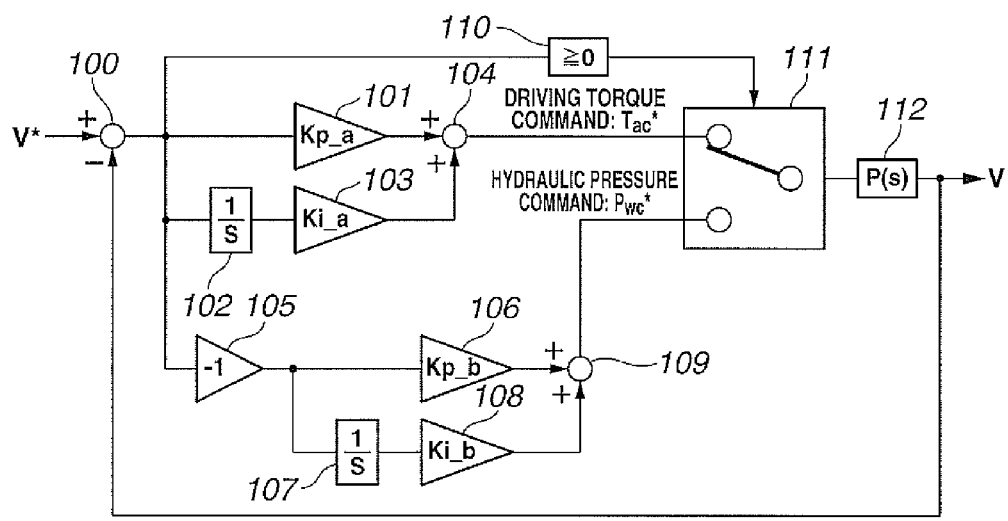
FIG. 4 is a control block diagram showing a vehicle speed control section 55.

FIG. 4 is a control block diagram of the vehicle speed control section 55.

A subtracter 100 outputs a vehicle speed deviation (V*−V) obtained by subtracting the vehicle speed V from the vehicle speed command V*.

A multiplier 101 multiplies the vehicle speed deviation by a proportional gain Kp_a.

An integrator 102 integrates the vehicle speed deviation.

A multiplier 103 multiplies an integrated value of the vehicle speed deviation by an integrating gain Ki_a.

An adder 104 outputs a summation of the outputs of both the multiplier 101 and 103 as the driving torque command $T_{ac}{}^*$.

A multiplier 105 inverts the positive and negative (plus and minus) of the vehicle speed deviation.

A multiplier 106 multiplies the vehicle speed deviation after the inversion of the positive and negative by a proportional gain Kp_b.

An integrator 107 integrates the deviation of the vehicle speed after the inversion of the positive and negative.

A multiplier 108 multiplies the integrated value of the deviation after the judgment of the positive and negative by an integrated gain Ki_b.

An adder 109 outputs, as the hydraulic pressure command Pwc*, a summation of the outputs of both the multipliers 106 and 108.

A judgment (determination) device 110 outputs a link drive selection command=1 (true) when the vehicle speed deviation is equal to or greater than 0, and outputs the link drive selection command=0 (false) when the vehicle speed deviation is smaller than 0.

A switch 111 outputs the drive torque command $T_{ac}{}^*$ when the link drive selection command outputted from the judgment section 110 is 1, and outputs the hydraulic pressure command $P_{wc}{}^*$ when the link drive selection command is 0.

A plant model (vehicle model) 112 receives the drive torque command $T_{ac}{}^*$ or the hydraulic pressure command $P_{wc}{}^*$, and outputs the vehicle speed V.

As mentioned above, the vehicle speed control section 55 properly uses the drive motor 1 and the electric hydraulic pressure brake 2 in accordance with the positive and negative of the vehicle speed deviation (V*−V). When the vehicle speed deviation is equal to or greater than 0, the drive motor 1 is driven by the drive torque command $T_{ac}{}^*$ calculated by using the proportional gain Kp_a and the integrating gain Ki_a, so that the vehicle speed approaches the vehicle speed command V* by the driving force by the drive motor 1. At this time, the hydraulic pressure command $P_{wc}{}^*$ to the electric hydraulic pressure brake 2 is set to 0 so as not to generate the braking force. On the other hand, when the vehicle speed deviation is smaller than 0, the electric hydraulic pressure brake 2 is driven by the hydraulic pressure command $P_{wc}{}^*$ calculated by using the proportional gain Kp_b and the integrating gain Ki_b, so that the vehicle speed V approaches the vehicle speed command V* by the braking force by the electric hydraulic pressure brake 2. At this time, the drive torque command $T_{ac}{}^*$ to the drive motor 1 is set to 0 so as not to generate the driving force.

[Steering Angle Control]

Figure 5:
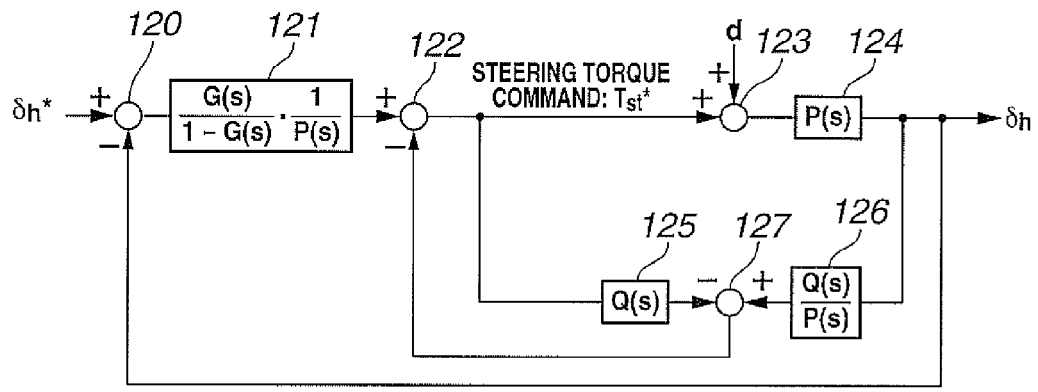
FIG. 5 is a control block diagram showing a steering angle control section 56.

FIG. 5 is a control block diagram of the steering angle control section 56. It is a two-degrees-of-freedom control by using an disturbance observer to counteract (cancel) a disturbance d. It is possible to freely set the steering angle response by the target response G.

A subtracter 120 outputs the steering angle deviation $(\delta_h{}^* - \delta_h)$ obtained by subtracting steering angle $\delta_h$ from the steering angle command $\delta_h{}^*$.

A model matching compensator 121 is a feed forward compensator configured to receive the steering angle deviation, and to output an ideal steering torque to correspond to a predetermined target response G.

A subtracter 122 outputs the steering torque command $T_{st}{}^*$ obtained by subtracting a disturbance estimation torque from the ideal steering torque.

An adder 123 adds the disturbance d to the steering torque command $T_{st}{}^*$.

A plant model (vehicle model) 124 is configured to receive the steering torque command including the disturbance, and to output the steering angle $\delta_h$.

A noise filter section 125 performs a filter operation of the steering torque command $T_{st}{}^*$ by a low-pass filter.

A reverse plant model 126 performs a filter operation of the steering torque command for obtaining the steering angle $\delta_h$ by the low pass filter which is the same as the low pass filter as the noise filter section 125.

A subtracter 127 outputs the disturbance estimation torque obtained by subtracting the output of the noise filter section 125 from the output of the reverse plant model 126.

All of the plant model P, the target response G, and the noise filter Q are first-order delay (primary delay) as following equations (1)-(3).

[equation 1]

$$P(s) = \frac{k\hat{\omega}_p}{s+\omega_p} \quad (1)$$

$$G(s) = \frac{\hat{\omega}_g}{s+\omega_g} \quad (2)$$

$$Q(s) = \frac{k\hat{\omega}_q}{s+\omega_q} \quad (3)$$

[equation 2]

$$\delta_h = G \cdot \delta_h^* \quad (4)$$

The target response G is a response later than a limit of the output of the electric power steering 3. Moreover, when the steering angular speed is large, the steering angle response does not become the target response G due to the limitation of the output of the electric power steering 3. However, when the variation rate of the steering angle to the movement distance is large, the track control section 54 decreases the vehicle speed command V. With this, the vehicle speed V is held to the lower value by the vehicle speed control. With this, the steering angular speed is held to the smaller value. Consequently, it is possible to hold the steering angle response to the target response G.

Next, an operation logic of a parking assist device according to the first embodiment is illustrated.

[At Double Parking]

Figure 6:
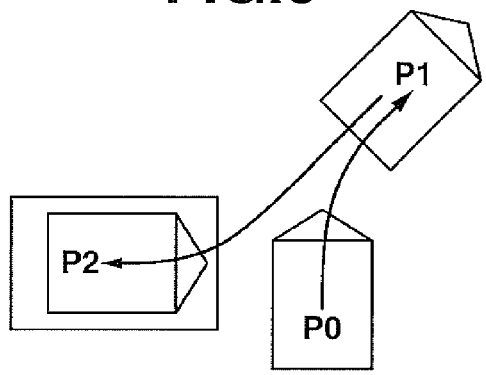
FIG. 6 is a view showing a vehicle behavior of a double park.
Figure 7:
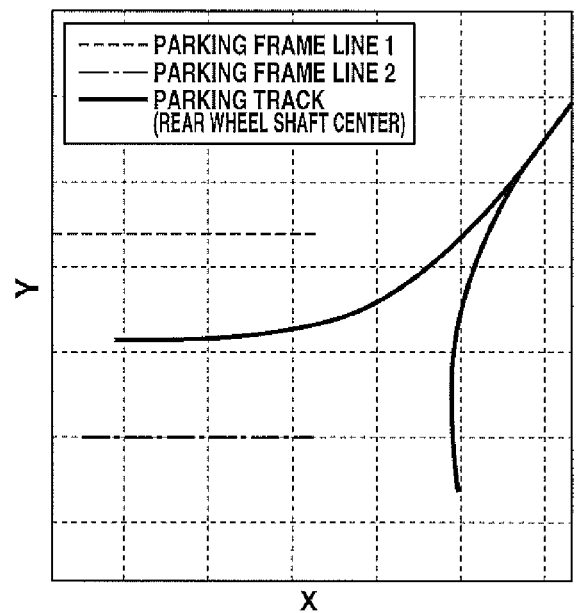
FIG. 7 is a view showing a parking track of a center of a vehicle axle of rear wheels when the parking track is a clothoid curve at the double park.

FIG. 6 is a view showing a motion (operation) of the vehicle at the double parking. The vehicle is moved in the forward direction from a parking operation start position P0 to a turning position P1. After the vehicle is stopped at the turning position P1, the vehicle is moved in the backward direction from the turning position P1 to a parking position P2. The vehicle is stopped at the parking position P2. A sequence of parking operation is wholly performed by the automatic control by using the drive motor 1, the electric hydraulic pressure brake 2, and the electric power steering 3. At the parking operation start position P0, the turning position P1, and the parking position P2, the steering angle is 0, and the steering is at the neutral position. From the start position of the forward movement and the backward movement to an intermediate point, the steering is increased. The steering angle is maximized at the intermediate point. From the intermediate point to the end position of the forward movement and the backward movement, the steering is returned. The variation rate of the curvature of the parking track to the movement distance is set to the constant. The parking track is set to a clothoid curve. For obtaining a parking track having a small rotation radius, the increase of the steering is finished before the intermediate point between the forward movement and the backward movement. The steering angle is fixed until the vehicle is moved some distance (for a while) after passing the intermediate point. Then, the steering is returned. With this, it is possible to combinedly use the clothoid curve and the arc. FIG. 7 shows a parking track of the center of the rear wheel shaft when the parking track is the clothoid curve at the double parking.

Figure 8:
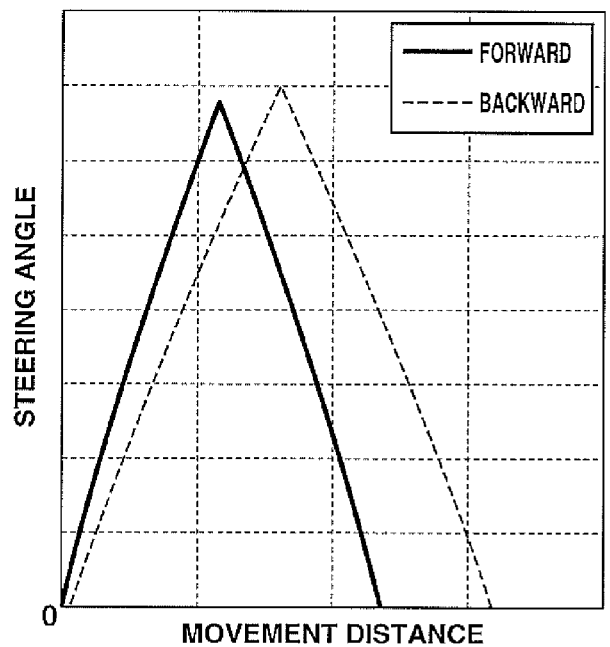
FIG. 8 is a view showing a relationship between a movement distance and a steering angle when a parking track is the clothoid curve at the double park.

FIG. 8 is a view showing a relationship between the movement distance and the steering angle in a case where the parking track is the clothoid curve at the double parking. The positive and the negative (the signs) at the forward movement and the backward movement are in the opposite directions. In this case, both the steering angles of the forward movement and the backward movement are represented by the positive. In the clothoid curve, the variation rate of the curvature to the length of the curve becomes constant. Accordingly, the variation rate of the steering angle to the movement distance becomes substantially constant. The relationship between the steering angle $\delta_h$ and the curvature $\chi$ is represented by the following equation (5) by using the steering gear ratio N and the wheel base l.

[equation 3]

$$\delta_h = N \tan^{-1}(l \cdot \chi) \approx N \cdot l \cdot \chi \quad (5)$$

The approximation of the equation (5) is satisfied in a region in which the product of the wheel base l and the curvature $\lambda$ is small. When the variation rate of the curvature to the movement distance is constant, the variation rate of the steering angle becomes constant.

In FIG. 8, at the start of the backward movement, the steering angle momently becomes 0. In this region, the movement distance becomes equal to or greater than a predetermined value at the steering angle 0 at the end of the forward movement due to the error of the vehicle speed by the vehicle speed control. Accordingly, the vehicle is reversely run by the excess amount of the movement distance in the forward movement at the steering angle 0 at the start of the backward movement. With this, the accuracy of the parking position is held.

When the steering angle with respect to the movement distance becomes as shown in FIG. 8, the accuracy of the parking position is held. For that, the accuracy of the steering angle needs to be held. However, in the steering angle control shown in FIG. 5, the steering angle $\delta_h$ with respect to the steering angle command $\delta_h^*$ becomes the first-delay order. Accordingly, the track control section 54 sets the steering angle of FIG. 8 to the steering angle target $\delta_{h\_tar}$. When the steering angle command $\delta_h$ is calculated as following equation (6), the steering angle $\delta_h$ and the steering angle target $\delta_{h\_tar}$ becomes equal to each other as shown in the following equation (7). The accuracy of the steering angle is held, so that the accuracy of the parking position is held.

[equation 4]

$$\delta_h^* = \frac{1}{G} \cdot \delta_{h\_tar} \quad (6)$$

$$\delta_h = G\delta_h^* = \delta_{h\_tar} \quad (7)$$

Moreover, when the steering angle command $\delta_h^*$ is determined as shown in the equation (6), the steering angle command $\delta_h^*$ becomes a summation of the steering angle target $\delta_{h\_tar}$, and a value obtained by a differential of the steering target $\delta_{h\_tar}$ multiplied by const.

[equation 5]

$$\delta_h^* = \frac{1}{G} \cdot \delta_{h\_tar} = \frac{s + \omega_g}{\omega_g} \cdot \delta_{h\_tar} = \delta_{h\_tar} + \frac{s}{\omega_g} \cdot \delta_{h\_tar} \quad (8)$$

In general, the differential includes a noise. As shown in FIG. 8, the steering angle target $\delta_{h\_tar}$ is substantially proportional to the movement distance L. The steering angle target $\delta_{h\_tar}$ is represented as the following equation (9) by using const k.

[equation 6]

$$\delta_{h\_tar} = kL \quad (9)$$

Accordingly, the time-derivative term of the equation (8) becomes the value obtained by the vehicle speed V multiplied by const as shown in the following equation (10).

[equation 7]

$$\frac{s}{\omega_g} \cdot \delta_{h\_tar} = \frac{1}{\omega_g} \frac{d}{dt}(kL) = \frac{kV}{\omega_g} \quad (10)$$

That is, the steering angle command $\delta_h^*$ is replaced by the following equation (11). The noise is decreased.

[equation 8]

$$\delta_h^* = \delta_{h\_tar} + \frac{kV}{\omega_g} \quad (11)$$

Figure 9:
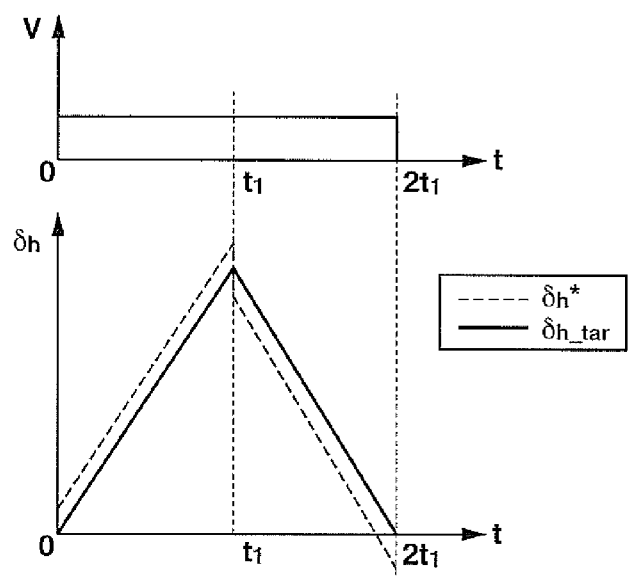
FIG. 9 is a view showing a relationship between a steering angle target $\delta_{h\_tar}$ and a steering angle command $\delta_h{}^*$ of equation (11) when a vehicle speed is constant.

FIG. 9 is a view showing a relationship between the steering angle target $\delta_{h\_tar}$ and the steering angle command $\delta_h^*$ of the equation (11) when the vehicle speed is constant. FIG. 9 shows the steering angle of the only forward movement. However, the case of the steering angle of the backward movement is also similar to this. The positive and the negative of the increasing and decreasing rate of the steering angle target $\delta_{h\_tar}$ is reversed by the half time $t_1$ of the necessary time $2t_1$. Accordingly, while the steering angle target $\delta_{h\_tar}$ is increased (while the steering is increased) during times $0$-$t_1$, the steering angle command $\delta_h{}^*$ becomes greater than the steering angle target $\delta_{h\_tar}$. When the steering angle target $\delta_{h\_tar}$ is decreased (the steering angle is returned) during times $t1$–$2t1$, the steering angle command $\delta_h{}^*$ becomes smaller than the steering angle target $\delta_{h\_tar}$.

Figure 10:
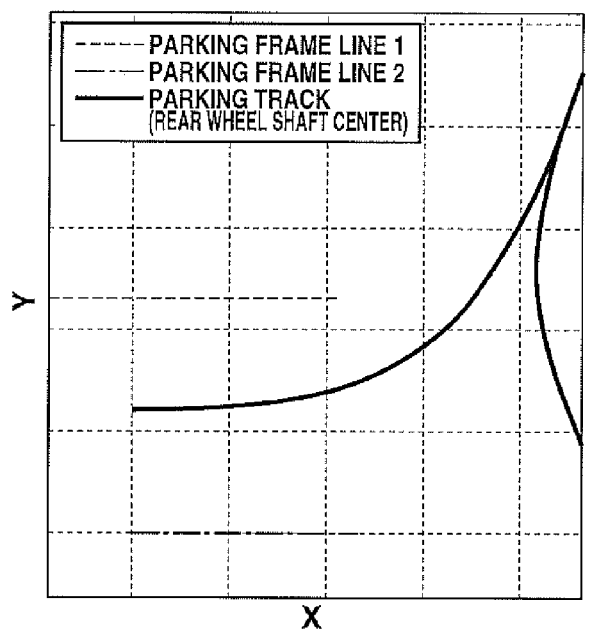
FIG. 10 is a view showing a parking track of the center of the vehicle shaft of the rear wheels when the parking track is the clothoid curve and an arc at the double parking.

FIG. 10 is a view showing a parking track of the center of the rear wheel shaft when the parking track is the clothoid curve and the arc at the double parking. The vehicle directs the parking frame at the parking operation start position P0. Accordingly, it is necessary to set the parking track having the small rotation radius. The clothoid curve and the arc are used as the parking track.

Figure 11:
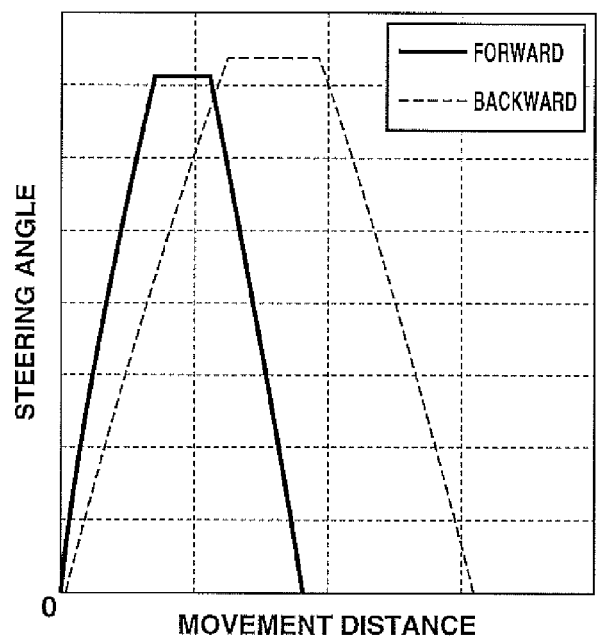
FIG. 11 is a view showing a relationship between the movement distance and the steering angle when the parking track is the clothoid curve and the arc at the double parking.

FIG. 11 is a view showing a relationship between the movement distance and the steering angle when the parking track is the clothoid curve and the arc at the double parking. The positive and the negative of the steering angle at the forward movement and the backward movement become in the opposite directions. However, in this case, both the steering angles at the forward movement and the backward movement are represented by the positive. A region in which the steering angle is varied with respect to the movement distance is a region of the clothoid curve. A region which is near the intermediate point, and in which the steering angle is constant is a region of the arc.

Figure 12:
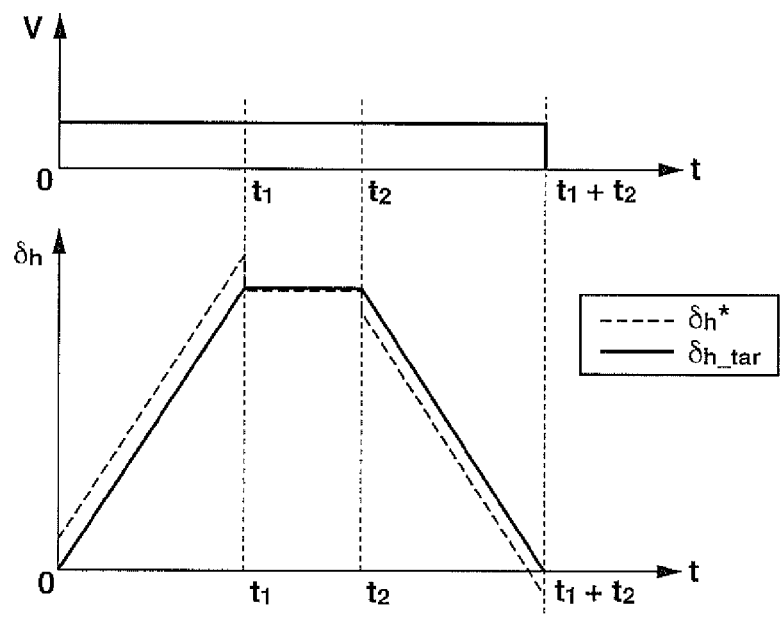
FIG. 12 is a view showing a relationship between the steering angle target $\delta_{h\_tar}$ and the steering angle command $\delta_h{}^*$ when the vehicle speed is constant.

FIG. 12 is a view showing a relationship between the steering angle target $\delta_{h\_tar}$ and the steering angle command $\delta_h{}^*$ of the equation (11) when the vehicle speed is the constant. FIG. 12 shows the steering angle only in the forward movement. However, this is identical in the steering angle of the backward movement. While the steering angle target $\delta_{h\_tar}$ is increased (While the steering is increased) during the times $0$-$t_1$, the steering angle command $\delta_h{}^*$ becomes greater than the steering angle target $\delta_{h\_tar}$. While the steering angle target $\delta_{h\_tar}$ is constant at the times $t_1$-$t_2$, the steering angle command $\delta_h{}^*$ becomes equal to the steering angle target $\delta_{h\_tar}$. While the steering angle target $\delta_{h\_tar}$ is decreased during $t_2$–$t_1$+$t_2$ (the steering angle is returned, the steering angle command $\delta_h{}^*$ becomes smaller than the steering angle target $\delta_{h\_tar}$.

[At Parallel Parking]

Figure 13:
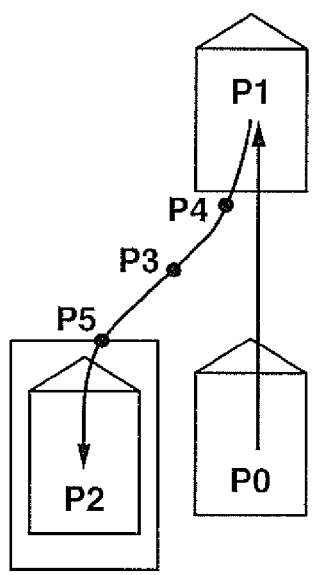
FIG. 13 is a view showing a vehicle movement (behavior) at a parallel parking.

FIG. 13 is a view showing a vehicle operation (behavior) of the parallel parking. The vehicle is moved in the forward direction from the parking operation start position P0 to the turning position P1. After the vehicle is stopped at the turning position P1, the vehicle is moved in the backward direction from the turning position P1 to the parking position P2. The vehicle is stopped at the parking position P2. A sequence of the parking operations are wholly performed by the automatic control by using the drive motor 1, the electric hydraulic pressure brake 2, and the electric power steering 3. An intermediate point of the backward movement is P3. Moreover, an intermediate point between the parking operation start position P1 and P3 is P4. An intermediate position between P3 and the parking position P2 is P5. The steering angle is 0 at the turning position P1, the parking position P2, and the intermediate position P3 of the backward movement. The steering is the neutral position. During the forward movement, the neutral position of the steering is held, so that the vehicle is moved in the forward direction. The steering is turned and increased from the start position P1 of the backward movement to the point P4 in a direction in which the vehicle approaches the parking position. The steering angle is maximized at the point P4. The steering is returned from the point P4 to the point P3. Moreover, the steering is turned and increased from the point P3 to the point P5 in a direction opposite to a direction from the point P1 to the point P3. The steering angle is maximized at the point P5. The steering is returned from the point P5 to the parking position P2. The variation rate of the curvature of the parking track to the movement distance is set to constant, so that the parking track is set to the clothoid curve. It is possible to combindly use the clothoid curve and the arc as the parking track so that the parking track has the small rotation radius, like the case of the double parking.

Figure 14:
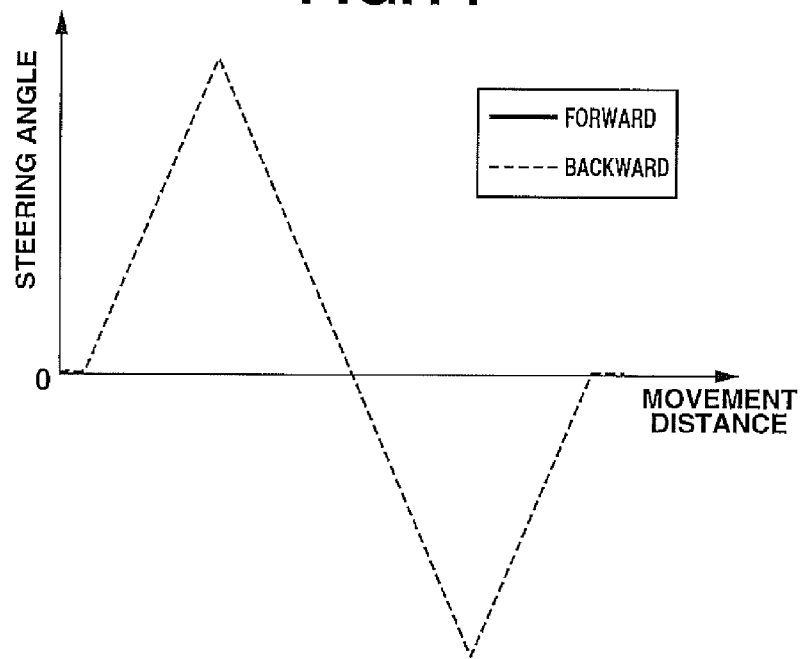
FIG. 14 is a relationship between a movement distance and a steering angle when a parking track is the clothoid curve at the parallel parking.

FIG. 14 is a view showing a relationship between the movement distance and the steering angle in a case where the parking track is the clothoid curve at the parallel parking. At the forward movement, the steering angle is fixed to 0. The vehicle is reversely run by the excess amount of the forward movement at the steering angle 0 momently at the start of the backward movement, like the case of the double parking.

Figure 15:
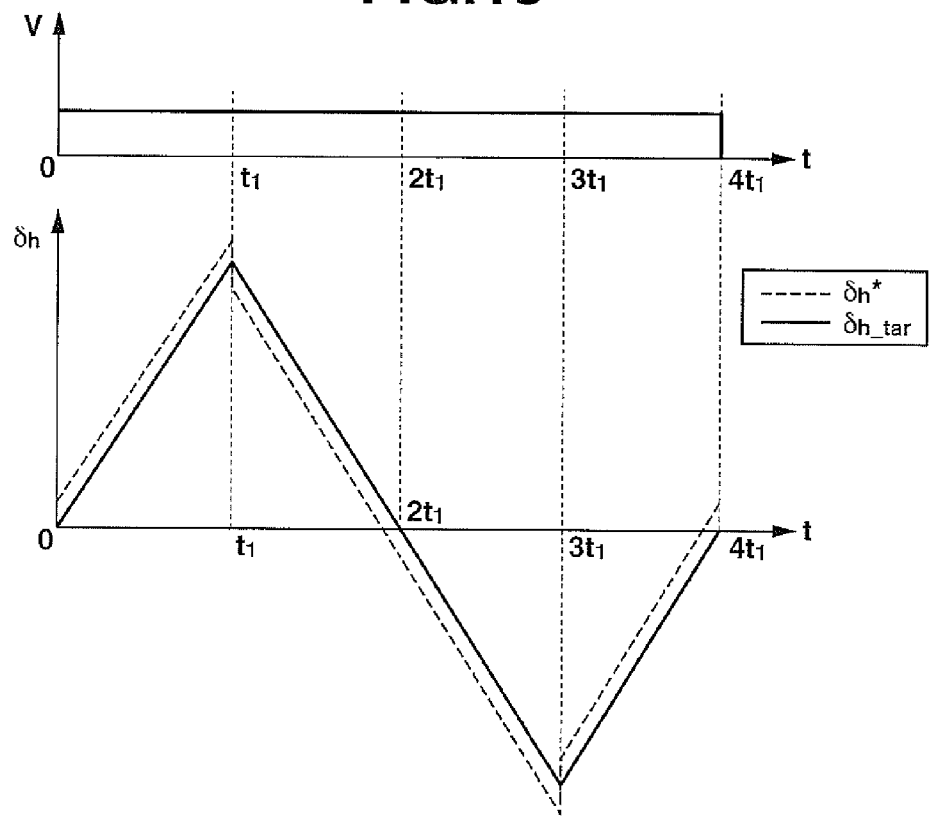
FIG. 15 is a view showing a relationship between a steering angle target $\delta_{h\_tar}$ and the steering angle command $\delta_h{}^*$ when the steering angle of FIG. 14 is the steering angle target $\delta_{h\_tar}$.

FIG. 15 is a view showing a relationship between the steering angle target $\delta_{h\_tar}$ and the steering angle command $\delta_h{}^*$ when the steering angle is the steering angle target $\delta_{h\_tar}$. The time 0 is a time at which the steering is started at the backward movement. While the steering angle target $\delta_{h\_tar}$ is increased (while the steering is increased) during times $0$-$t_1$, the steering angle command $\delta_h{}^*$ becomes greater than the steering angle target $\delta_{h\_tar}$. While the steering angle target $\delta_{h\_tar}$ is decreased during time $t_1$-$3t_1$ (the steering (angle) is decreased and returned from time $t_1$ to time $2t_1$, and the steering is turned and increased in the opposite direction from time $2t_1$ to $3t_1$), the steering angle command $\delta_h{}^*$ becomes smaller than the steering angle target $\delta_{h\_tar}$. Moreover, while the steering angle target $\delta_{h\_tar}$ is increased (the steering is returned) at times $3t_1$-$4t_1$, the steering angle command $\delta_h{}^*$ becomes greater than the steering angle target $\delta_{h\_tar}$.

[Improvement of Parking Position Accuracy]

Devices described in a Japanese Patent Application Publication No. 10-278825 and a Japanese Patent Application Publication No. 2004-338638 are known as devices to assist the parking operation of the driver by automatically varying the steering angle during the running of the vehicle.

The former is configured to automatically control the steering angle, and to warn when the brake operation amount of the driver is deviated from a reference value during the parking operation. The latter is configured to estimate the delay of the steering angle with respect to the steering angle command before the start of the parking operation, and to restrict (limit) the increase/decrease rate of the curvature of the parking track. Moreover, the latter is configured to measure the delay of the steering angle with respect to the steering angle command during the parking operation, and to reset the parking track.

However, the former one of the above-described conventional arts is configured to warn with respect to the driver. However, the driver controls the vehicle speed. Accordingly, the vehicle speed tends to be increased and decreased. It is difficult to hold the accuracy of the steering angle in accordance with the increase and the decrease of the vehicle speed. Consequently, it is difficult to attain the accuracy of the parking position. In the latter one, the delay of the steering angle with respect to the steering angle command is not dissolved. With this, the parking track is restricted. Moreover, the steering operation does not become smooth by the resetting of the parking track during the parking operation, so that the unnatural feeling is provided to the driver.

On the other hand, in the parking assist device according to the first embodiment, the parking position is recognized by the parking frames and the positions of the other parked vehicles of the images of the cameras 11-14. The driving motor 1, the electric hydraulic brake 2, and the electric power steering 3 is automatically controlled so that the vehicle reaches the recognized parking position. That is, by automatically controlling the steering angle and the vehicle speed together, it is possible to control, at the high accuracy, the running path of the vehicle which is determined by the steering angle and the vehicle speed, and to improve the accuracy of the parking position.

The parking track setting section 51 sets the parking track based on the recognized parking position. The track control section 54 determines the vehicle speed command V* and the steering angle command $\delta_h{}^*$ from the parking track and the movement distance of the vehicle. In this case, the track control section 54 sets the vehicle speed command V* to the constant value, both at the forward movement and the backward movement. In general, the steering angle is easy to be controlled as the vehicle speed variation is smaller. Moreover, in the first embodiment, the steering angle command $\delta_h{}^*$ is influenced by the vehicle speed variation as shown in the equation (10). However, the vehicle speed V is automatically held to the substantially constant value by the vehicle speed control section 55 configured to perform the PI control so as to eliminate the vehicle speed deviation (V*−V). Accordingly, the accuracy of the steering angle is held.

The setting of the parking track is performed only one time at the start of the parking operation. The correction of the parking track is not performed during the parking operation. Accordingly, it is possible to suppress the sudden variation of the steering angle command $\delta_h{}^*$ during the parking operation. Consequently, it is possible to attain the vehicle behavior, and the steering operation which are smooth, which are easy to be expected by the driver, and to provide the secure feeling to the driver.

Moreover, the clothoid curve is used as the parking track. Or the clothoid curve and the arc are combindly used as the parking track. The clothoid curve is a curve whose the curvature is varied at the constant ratio. The clothoid curve is the track of the vehicle when the steering operation is performed at the constant speed while the vehicle runs at the constant speed. Accordingly, while the vehicle runs on the clothoid curve portion of the parking track, the vehicle speed V and the steering angular speed are held to the constant values. It is possible to attain the vehicle motion, and the steering operation which are smooth, and which are expected by the driver. It is possible to provide the secure feeling to the driver.

The wheel speed sensors 31-34 used by the vehicle speed control by the vehicle speed control section 55, and the steering angle sensor 4 used in the steering angle control by the steering angle control section 56 are combindly used with the anti-skid control and the anti-lock brake control. The only sensor (cameras 11-14 in the case of the first embodiment) configured to obtain the parking position information at the parking operation start position are needed as the other sensors. Accordingly, it is possible to suppress the cost increase.

The steering angle control section 56 sets the target response G of the steering angle control to the response later than the limit of the output of the electric power steering 3, so that the steering angle response surely becomes the target response. That is, the steering angle response is held to the predetermined response to have the slightly margin with respect to the output of the electric power steering 3. The steering angle target $\delta_{h\_tar}$ can be to the steering angle $\delta_h$ by the steering angle command $\delta_h{}^*$ obtained by the inverse operation from the steering angle response. It is possible to maintain the accuracy of the steering angle.

Besides, the steering angle response does not become the target response G by the limit of the output of the electric power steering 3 when the steering angular speed is large. However, by holding the vehicle speed V to the lower value by the vehicle speed control when the variation rate of the steering angle $\delta_h$ to the movement distance is large, the steering angular speed is held to the lower value. With this, it is possible to hold the steering angle response to the target response G. That is, when the steering angular speed is large, the accuracy of the steering angle is held by holding the vehicle speed V to the lower value.

Next, effects are illustrated.

In the parking assist device according to the first embodiment, the following effects are attained.

(1) There are provided a steering angle sensor 4 arranged to sense a steering angle $\delta_h$ of the left and right front wheels 41 and 42, a vehicle speed sensing section configured to sense the vehicle speed V, a track control section 54 configured to set the steering angle command $\delta_h{}^*$ and the vehicle speed command V*, an automatic steering control device (an electric power steering 3, and electronic control unit 5) configured to automatically steer the left and right front wheels 41 and 42 so that the sensed steering angle $\delta_h$ becomes the steering angle command $\delta_h{}^*$, an automatic vehicle speed control device (the driving motor 1, the electric hydraulic brake 2, the wheel cylinders 21-24, the wheels 41-44, and the electronic control unit 5) configured to automatically control the vehicle speed V so that the sensed vehicle speed V becomes the vehicle speed command V*, and cameras 11-14 configured to recognize the parking space of (for) the host vehicle. The host vehicle is parked at the recognized parking position by the automatic steering control device and the automatic vehicle speed control device.

With this, the steering angle $\delta_h$ and the vehicle speed V is automatically controlled. Accordingly, it is possible to control the running path of the vehicle which is determined by the steering angle $\delta_h$ and the vehicle speed V at the high accuracy, and to improve the accuracy of the parking position.

(2) There is provided the electronic control unit 5. The electronic control unit 5 is configured to set the parking track between the position of the host vehicle and the parking position which is recognized by the cameras 11-14, and to control the automatic steering control device and the automatic vehicle speed control device so that the vehicle runs along the set parking track.

With this, it is possible to set the parking track at the high accuracy, and thereby to improve the accuracy of the parking position.

(3) There is provided the electronic control unit 5. The electronic control unit 5 is configured to set the parking track having the clothoid curve between the position of the host vehicle and the parking position which is recognized by the cameras 11-14, and to control the automatic steering control device and the automatic vehicle speed control device so that the vehicle runs along the set parking track.

With this, the vehicle speed V and the steering angular speed is held to the constant value while the vehicle runs along the clothoid curve portion of the parking track. It is possible to attain the smooth vehicle operation and the smooth steering operation which are easy to be expected by the driver, and to provide the secure feeling to the driver.

(4) There is provided the electronic control unit 5. The electronic control unit 5 sets the parking track between the position of the host vehicle and the parking position which is recognized by the cameras 11-14, and to control the automatic steering control device by correcting the steering angle command $\delta_h^*$ with respect to the steering response of the automatic steering control device so that the vehicle runs along the set parking track.

With this, the steering angle target $\delta_{h\_tar}$ and the steering angle $\delta_h$ become equal to each other. The accuracy of the steering angle $\delta_h$ is held. Accordingly, the accuracy of the parking position is held.

(5) There is provided the electronic control unit 5. The electronic control unit 5 sets the parking track between the position of the host vehicle and the parking position which is recognized by the cameras 11-14, and to control the automatic vehicle speed control device so that the vehicle speed becomes small when the variation rate of the steering angle to the movement distance by which the host vehicle is moved along the set parking track is large, relative to a case in which the variation rate is small.

With this, even when the steering angular speed is large, it is possible to hold the steering angle response to the target response G. The accuracy of the steering angle is held. It is possible to improve the accuracy of the parking position.

Hereinafter, technical idea other than the invention described in the claims to be recognized from the embodiments are illustrated.

(a) The parking assist device claimed in claim 1 includes the controller.

The controller is configured to set the running track between the position of the host vehicle and the parking space when the parking space recognizing section recognizes the parking space, and to set the target value of the steering angle and the target value of the vehicle speed so that the vehicle draws the set running track.

With this, it is possible to control the running track at the high accuracy, and to improve the accuracy of the parking position.

(b) The parking assist control device claimed in claim 1 includes the controller.

The controller is configured to stop the host vehicle when the driver operates the brake pedal during the control by the automatic steering control device and the automatic vehicle speed control device.

With this, when the obstacle enters the parking path, the brake operation of the driver has a priority, and it is possible to avoid the contact to the obstacle.

(c) In the parking assist device claimed in (b), the controller is configured to restart the control by the automatic steering control device and the automatic vehicle speed control device when the operation of the brake pedal is released during the stop of the vehicle.

With this, in a case where the obstacle is apart from the parking path, it is possible to automatically restart the parking assist.

(d) The parking assist device claimed in claim 1 includes the controller.

The controller is configured to cancel the control by the automatic steering control device and the automatic vehicle speed control device when the shift position of the forward movement and the backward movement is varied by the driver, or when the steering torque by the driver becomes equal to or greater than the predetermined value, during the control by the automatic steering control device and the automatic vehicle speed control device.

With this, it is possible to run the vehicle so that the shift operation or the steering operation of the driver has the priority.

(e) In the parking assist device claimed in claim 1, the automatic vehicle speed control device includes the electric motor configured to drive the wheels, and the wheels.

With this, it is possible to improve the accuracy of the parking position in the electric vehicle and the hybrid vehicle in which the electric motor drives the wheels.

(f) The parking assist device includes a steering angle sensing section configured to sense the steering angle of the steering wheel, a vehicle speed sensing section configured to sense the vehicle speed, the automatic vehicle speed control device configured to automatically control the vehicle speed so that the sensed vehicle speed becomes the target vehicle speed, and the parking space recognizing section configured to recognize the parking space of the host vehicle, the steering control command value and the vehicle speed control command value being outputted to the control devices so that the host vehicle is parked within the recognized parking space.

With this, the steering angle and the vehicle speed are automatically controlled. It is possible to control the running path of the vehicle determined by the steering angle and the vehicle speed at the high accuracy, and to improve the accuracy of the parking position.

(g) The parking assist device described in (f) includes the controller.

The controller is configured to stop the host vehicle when the driver operates the brake pedal during the control by the automatic steering control device and the automatic vehicle speed control device.

With this, when the obstacle enters the parking path, the brake operation of the driver has the priority. It is possible to avoid the contact with the obstacle.

(h) In the parking assist device described in (g), the controller is configured to restart the control by the automatic steering control device and the automatic vehicle speed control device when the operation of the brake pedal is released during the stop.

With this, it is possible to automatically restart the parking assist when the obstacle is apart from the parking path.

(i) In the parking assist device described in (h), the controller is configured to cancel the control by the automatic steering control device and the automatic vehicle speed control device when the shift position of the forward movement and the backward movement is varied by the driver or when the steering torque by the driver becomes equal to or greater than the predetermined value during the control by the automatic steering control device and the automatic vehicle speed control device.

With this, it is possible to run the vehicle so that the shift operation of the driver or the steering operation has the priority.

(j) In the parking assist device described in (f), the controller is configured to set the running track between the position of the host vehicle and the parking space recognized by the parking space recognizing section, and to control the control devices so that the vehicle runs along the set running track.

With this, it is possible to control the running track at the high accuracy, and to improve the accuracy of the parking position.

(k) In the parking assist device described in (j), the parking track includes the clothoid curve.

With this, when the vehicle runs along the clothoid curve portion of the parking track, the vehicle speed and the steering angular speed are held to the constant. It is possible to attain the smooth vehicle behavior and the smooth steering operation which are easy to be expected. Accordingly, it is possible to provide the secure feeling to the driver.

(l) In the parking assist device described in (k), the controller is configured to control the automatic steering control device by correcting the target value of the steering angle with respect to the steering angle response of the automatic steering control device so that the vehicle runs on the set running track.

With this, the target value of the steering angle and the steering angle can be equal to each other. The accuracy of the steering angle is held. The accuracy of the parking position is held.

(m) The parking assist device described in claim 1 includes the controller.

The controller is configured to set the running track between the position of the host vehicle and the parking space recognized by the parking space recognizing section, and to control the vehicle speed control device so that the vehicle speed becomes small when the variation rate of the steering angle to the movement distance by which the host vehicle is moved on the set running track is large, relative to a case where that variation rate is small.

With this, even when the steering angular speed is large, the steering angular speed can be held to the target response. The accuracy of the steering angle is held. It is possible to improve the accuracy of the parking position.

(n) In the parking assist device described in (m), the controller is configured to set the running track between the position of the host vehicle and the parking space when the parking space recognizing section recognizes the parking space, and to set the target value of the steering angle and the target value of the vehicle speed so that the vehicle draws the set running track.

With this, it is possible to control the running track at the high accuracy, and to improve the accuracy of the parking position.

(o) A control method of the parking assist device includes: calculating the running track until the host vehicle is parked in the parking space, setting the target steering angle and the target vehicle speed for drawing the calculated running track, and controlling the automatic steering control device and the automatic vehicle speed control device in accordance with the set target steering angle and the target vehicle speed.

With this, it is possible to control the running track at the high accuracy, and thereby to improve the accuracy of the parking position.

EXPLANATION OF SYMBOLS

1 driving motor (automatic vehicle speed control device, electric motor)
2 electric hydraulic brake (automatic vehicle speed control device)
3 electric power steering (automatic steering control device)
4 steering angle sensor (steering angle sensing section)
5 electronic control unit (automatic vehicle speed control device, automatic steering control device, controller)
11-14 cameras (parking space recognizing section)
21-24 wheel cylinders (automatic vehicle speed control device)
41, 42 left and right front wheels (automatic vehicle speed control device)
43, 44 left and right rear wheels (automatic vehicle speed control device)
53 vehicle speed calculating section (vehicle speed sensing section)
54 track control section (target steering angle setting section, target vehicle speed setting section)

The invention claimed is:

1. A parking assist device comprising:
   a steering angle sensing section configured to sense a steering angle of a steering wheel;
   a vehicle speed sensing section configured to sense a vehicle speed;
   a target steering angle setting section configured to set a target value of the steering angle;
   a target vehicle speed setting section configured to set a target value of the vehicle speed;
   an automatic steering control device configured to automatically steer the steering wheel by a steering angle command value so that the sensed steering angle becomes the target steering angle;
   an automatic vehicle speed control device configured to automatically control the vehicle speed so that the sensed vehicle speed becomes the target vehicle speed; and
   a parking space recognizing section configured to recognize a parking space of the host vehicle,
   the host vehicle being parked within the recognized parking space by the automatic steering control device and the automatic vehicle speed device,
   a running track between a position of the host vehicle and the parking space recognized by the parking space recognizing section being set,
   the automatic steering control device being controlled by correcting the steering angle command value as to a steering response of the automatic steering control device, which is a response of the steering angle with respect to the target value of the steering angle, so that the host vehicle runs along the set running track,
   wherein the steering angle command value is calculated from the target value of the steering angle and the sensed steering angle by using a model matching compensator configured to match the steering response of the automatic steering control device with a predetermined reference model.

2. The parking assist device as claimed in claim 1, wherein the parking assist device further comprises a controller; and the controller is configured to set a running track between a position of the host vehicle and the parking space recognized by the parking space recognizing section, and to control the control devices so that the vehicle runs along the set running track.

3. The parking assist device as claimed in claim 1, wherein the parking assist device further comprises a controller; and the controller is configured to set a running track having a clothoid curve between a position of the host vehicle and the parking space recognized by the parking space recognizing section, and to control the control devices so that the vehicle runs along the set running track.

4. The parking assist device as claimed in claim 1, wherein the parking assist device further comprises a controller; and the controller is configured to set a running track between a position of the host vehicle and the parking space recognized by the parking space recognizing section, and to control the automatic vehicle speed control device so that the vehicle speed become small when a variation rate of the steering angle to the movement distance by which the host vehicle is moved along the set running track is large, relative to a case in which the variation rate is small.

5. The parking assist device as claimed in claim 1, wherein the parking assist device further comprises a controller; and the controller is configured to set a running track between a position of the host vehicle and the parking space when the parking space recognizing section recognizes the parking space, and to set the target value of the steering angle and the target value of the vehicle speed so that the vehicle draws the set running track.

6. The parking assist device as claimed in claim 1, wherein the parking assist device further comprises a controller; and the controller is configured to stop the host vehicle when the driver operates the brake pedal during the control by the automatic steering control device and the automatic vehicle speed control device.

7. The parking assist device as claimed in claim 6, wherein the controller is configured to restart the control by the automatic steering control device and the automatic vehicle speed control device when the operation of the brake pedal is released during the stop.

8. The parking assist device as claimed in claim 1, wherein the parking assist device further comprises a controller; and the controller is configured to cancel the control by the automatic steering control device and the automatic vehicle speed control device when the driver varies a shift position of the forward movement and the backward movement, or when the steering torque by the driver becomes equal to or greater than a predetermined value, during the control by the automatic steering control device and the automatic vehicle speed control device.

9. The parking assist device as claimed in claim 1, wherein the automatic vehicle speed control device includes wheels, and an electric motor arranged to drive the wheels.

10. A parking assist device comprising:
a steering angle sensing section configured to sense a steering angle of a steering wheel;
a vehicle speed sensing section configured to sense a vehicle speed;
an automatic steering control device configured to automatically steer the steering wheel so that the sensed steering angle becomes a target steering angle;
an automatic vehicle speed control device configured to automatically control the vehicle speed so that the sensed vehicle speed becomes a target vehicle speed; and
a parking space recognizing section configured to recognize a parking space of a host vehicle,
a steering control command value and a vehicle speed control value being outputted to the control devices so that the host vehicle is parked within the recognized parking space,
a running track between a position of the host vehicle and the parking space recognized by the parking space recognizing section being set,
the automatic steering control device being controlled by correcting the steering control command value as to the steering response of the automatic steering control device, which is a response of the steering angle with respect to the target steering angle, so that the host vehicle runs along the set running track,
wherein the steering angle command value is calculated from the target steering angle and the sensed steering angle by using a model matching compensator configured to match the steering response of the automatic steering control device with a predetermined reference model.

11. The parking assist device as claimed in claim 10, wherein the parking assist device further comprises a controller; and the controller is configured to stop the host vehicle when the driver operates the brake pedal during the control by the automatic steering control device and the automatic vehicle speed control device.

12. The parking assist device as claimed in claim 11, wherein the controller is configured to restart the control by the automatic steering control device and the automatic vehicle speed control device when the operation of the brake pedal is released during the stop.

13. The parking assist device as claimed in claim 12, wherein the controller is configured to cancel the control by the automatic steering control device and the automatic vehicle speed control device when the driver varies a shift position of the forward movement and the backward movement, or when the steering torque by the driver becomes equal to or greater than a predetermined value, during the control by the automatic steering control device and the automatic vehicle speed control device.

14. The parking assist device as claimed in claim 10, wherein the running track includes a clothoid curve.

15. The parking assist device as claimed in claim 14, wherein the controller is configured to set the running track between the position of the host vehicle and the parking space recognized by the parking space recognizing section, and to control the automatic vehicle speed control device so that the vehicle speed becomes small when a variation rate of the steering angle to the movement distance by which the host vehicle is moved along the set running track is large, relative to a case where the variation rate is small.

16. The parking assist device as claimed in claim 15, wherein the controller is configured to set the running track between the position of the host vehicle and the parking space when the parking space recognizing section recognizes the parking space, and to set the target value of the steering angle and the target value of the vehicle speed so that the vehicle draws the set running track.

17. A control method of a parking assist device comprising:
recognizing a parking space for parking the host vehicle;
calculating a running track for parking the host vehicle in a parking space;
setting a target steering angle and a target vehicle speed so that the vehicle draws the calculated running track;
providing, to an automatic steering control device, a steering angle command corrected as to a steering response of the automatic steering control device, which is a response of the steering angle with respect to the target steering angle, so that the vehicle runs along the calculated running track by the target steering angle and the target vehicle speed;
calculating the steering angle command from the target steering angle and the sensed steering angle by using a model matching compensator configured to match the steering response of the automatic steering control device with a predetermined reference model; and
controlling the automatic steering control device and an automatic vehicle speed control device so that the target steering angle and the target vehicle speed are attained.

* * * * *